United States Patent [19]
Plumley

[11] 3,722,402
[45] Mar. 27, 1973

[54] BARBECUE GRIDDLE

[75] Inventor: Elizabeth Emmett Plumley, Richmond, Va.

[73] Assignee: David A. Brown, Richmond, Va.; a part interest

[22] Filed: Nov. 18, 1969

[21] Appl. No.: 877,765

[52] U.S. Cl. ..................................99/467, 99/450
[51] Int. Cl. ..............................A23b 1/04
[58] Field of Search........99/254, 260, 261, 422, 425, 99/444, 445, 446, 450, 424, 349, 467; 126/59.5, 390, 14, 215; 220/44

[56] References Cited

UNITED STATES PATENTS

| | | | |
|---|---|---|---|
| 2,439,283 | 4/1948 | Bennett | 99/450 |
| 3,552,302 | 1/1971 | Gilberg | 99/450 X |
| 114,444 | 5/1871 | Jones | 99/450 |
| 2,579,258 | 12/1951 | Heckert | 99/349 |
| 1,736,223 | 11/1929 | Silen | 99/422 X |
| 2,180,868 | 11/1939 | Dunning et al. | 99/446 UX |
| 2,417,266 | 3/1947 | Petrakakis | 99/450 X |
| 2,573,719 | 11/1951 | Lebherz | 220/44 A |
| 2,645,993 | 7/1953 | Voss | 99/259 |
| 3,046,971 | 7/1962 | Hogshire | 99/450 X |
| 3,385,281 | 5/1968 | O'Russa | 220/44 |

*Primary Examiner*—Robert W. Jenkins
*Assistant Examiner*—Arthur O. Henderson
*Attorney*—Burns, Doane, Swecker & Mathis

[57] ABSTRACT

A barbecue griddle adapted to overlie a charcoal fire or the like and including a heat conductive plate with an upper cooking surface. A plurality of smoking apertures are spaced generally evenly about the plate and extend therethrough from the upper cooking surface to the lower plate surface. A downwardly extending flange defines, together with the lower plate surface, a smoke collection chamber for collecting smoke flowing upwardly from the fire and for directing the collected smoke upwardly through the smoking apertures so as to overlie the cooking surface. The outer periphery of the cooking surface is provided with an upwardly extending retainer means that inhibits grease from flowing over the side of the cooking surface and also serves to prevent food from freely sliding off the cooking surface. A suitable handle may be provided for the griddle.

9 Claims, 6 Drawing Figures

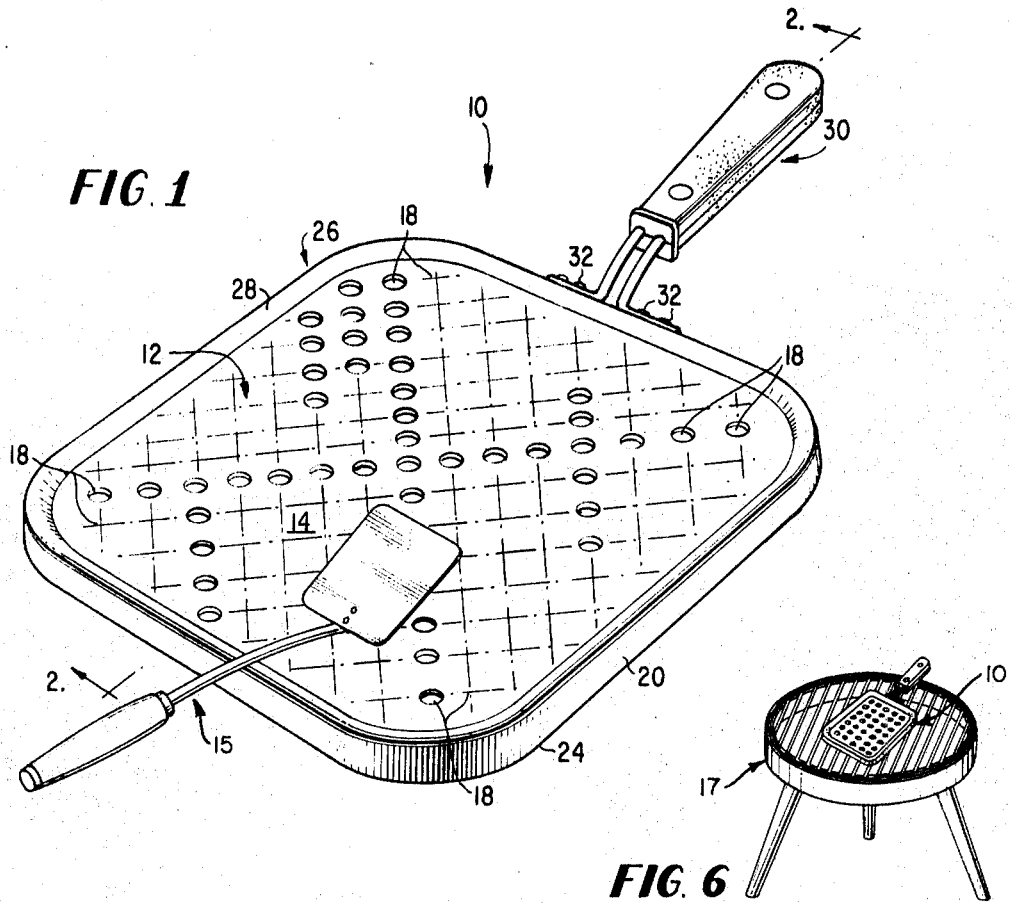
FIG. 1
FIG. 6
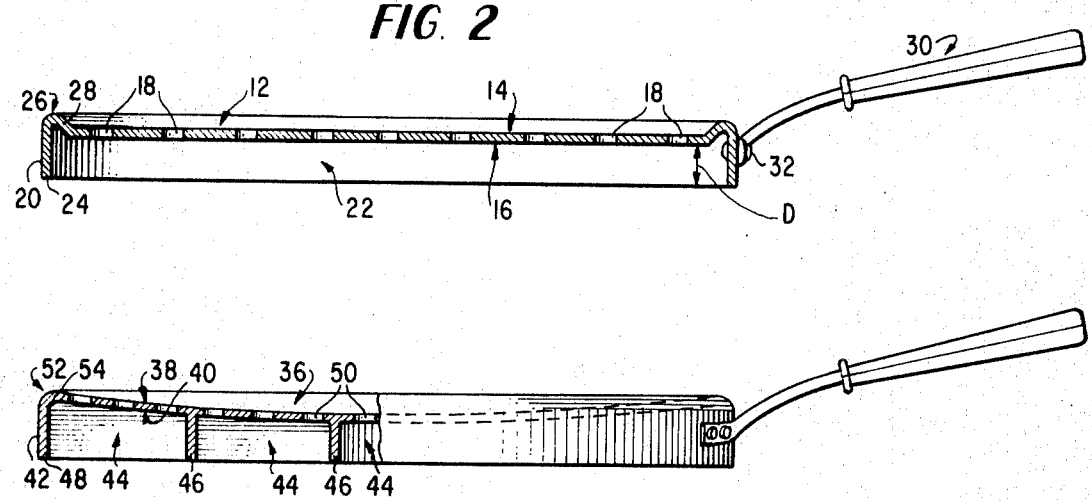
FIG. 2
FIG. 5
INVENTOR
ELIZABETH EMMETT PLUMLEY
BY
Burns, Doane, Benedict, Swecker & Mathis
ATTORNEYS

INVENTOR
ELIZABETH EMMETT PLUMLEY

BARBECUE GRIDDLE

BACKGROUND OF THE INVENTION

This invention relates to cooking apparatus. More particularly, this invention relates to a cooking apparatus for use in barbecuing or the like.

In connection with barbecuing food, it has been common for many years to employ grills to provide the cooking surface. Some of these grills have been provided with handles, as in the case of hibachis.

Although such barbecuing grills may often prove satisfactory, they may sometimes be undesirable for a number of reasons.

For example, the relatively open network of the grills, while permitting smoke to reach the food and also serving to conduct a degree of heat to the food, does not provide a cooking surface readily amenable to the turning over of food. Thus, hamburgers or the like are often dropped into the charcoal bed during the turning over process. Similar problems are encountered when it is desired to move the food to a cooler or hotter portion of the grill or to temporarily remove the foot in the case of unwanted flames from the coals.

Moreover, the relatively open grill network makes it extremely difficult to cook thin slices of food, such as bacon strips, without these thin slices being dropped through the grill.

In this connection, it has been a past cooking practice to utilize frying pans to rest on a grill so that objects, such as bacon strips, may be readily cooked outdoors, or so that mobility of food away from hot or cold areas is facilitated. However, the flavoring of the food by smoking is substantially eliminated in this process.

OBJECTS AND SUMMARY OF THE INVENTION

It is, therefore, a general object of the invention to obviate or minimize disadvantages of the sort previously noted.

It is particularly an object of the invention to provide a barbecue griddle which serves to facilitate flavoring of the food by adequate smoking while avoiding problems associated with moving the food to hotter or cooler zones or with turning over of the food.

It is yet another object of the invention to provide such a barbecue griddle with a smoke collection chamber for collecting smoke flowing upwardly from a smoke source and for directing the collected smoke so as to cause it to overlie the cooking surface.

It is a further object of the invention to provide such a barbecue griddle which improves the ability to cook thin food slices, such as bacon strips.

It is still another object of the invention to provide such a griddle with retainer means for inhibiting the flow of grease over the side of the cooking surface and for preventing food from freely sliding off the cooking surface.

A preferred embodiment of the invention intended to accomplish at least some of the foregoing objects comprises a barbecue griddle in the form of a heat conductive plate member with an upper cooking surface and a lower surface. A suitable handle may be connected to the plate member so that it may be raised or lowered or moved to hotter or cooler positions relative to a source of heat and smoke, such as a conventional charcoal fire.

The plate member is provided with a plurality of spaced, smoking apertures extending therethrough from the upper cooking surface to the lower surface. The lower surface and a peripherially and downwardly extending flange together provide means for defining a smoke collection chamber. This chamber is operative to collect smoke flowing upwardly from the smoke source and to direct the collected smoke further upwardly through the smoking apertures so as to overlie the cooking surface of the plate member.

A retaining means is provided adjacent the outer periphery of the upper surface to inhibit grease from dripping downwardly over the outer periphery of the cooking surface and to prevent food on the cooking surface from freely sliding off of that surface. This retaining means may be in the form of an outer flange extending peripherially about the cooking surface and projecting upwardly therefrom.

Another preferred form of the retaining means is embodied in the outer periphery of the plate member itself with the plate member being generally dished.

Preferably, the smoking apertures are generally evenly spaced about the plate member to provide for even flavoring of the food to be cooked. Also, the surface area of the cooking surface is preferably greater than the surface area defined by the smoking apertures so that a major part of the cooking is done by heat conduction through the cooking surface, thereby reducing the loss of radiant energy from the source of heat.

Both the retaining means and the flange forming a portion of the smoke collection means may be integrally formed with the plate member, in the preferred embodiment, so that apart from the handle the barbecue griddle may be manufactured from a single stamping of metal stock material.

THE DRAWINGS

Other objects and advantages of the present invention will become apparent from the subsequent detailed description thereof with reference to the accompanying drawings in which:

FIG. 1 is a perspective view of one preferred form of a barbecue griddle according to the present invention, with a conventional spatula cooperable therewith depicted in phantom, FIG. 2 is a cross-sectional view of the barbecue griddle of FIG. 1 taken along line 2—2 thereof;

FIG. 5 is a cross-sectional view of the barbecue griddle of FIG. 4 taken along line 5—5 therein;

FIG. 6 is a schematic illustration of the griddle of FIG. 1 as used with a conventional barbecue grill depicted in phantom.

DETAILED DESCRIPTION OF THE INVENTION

Figure 3:
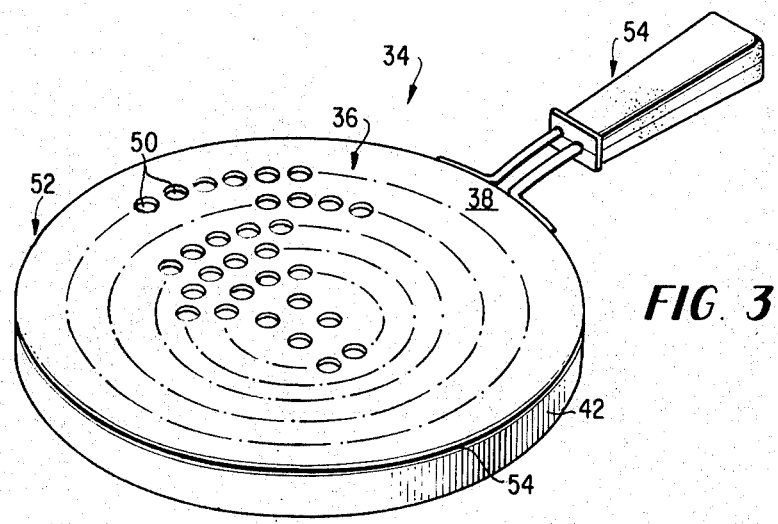
FIG. 3 is a perspective view of another preferred form of a barbecue griddle of the present invention.

Referring now to FIGS. 1 and 2, one preferred form of a barbecue griddle 10 in accordance with the present invention is there illustrated.

The griddle comprises a heat conductive plate member 12 having an upper cooking surface 14 and a lower surface 16. Extending through the plate member 12 from the upper cooking surface 14 to the lower surface 16 are a plurality of smoking apertures 18, some of which are only schematically shown.

Preferably, these apparatus are, as illustrated, evenly spaced about the cooking surface. The even spacing of the apertures 18 serves to insure that food may be generally evenly flavored by smoke passing through the apertures as subsequently described. Also as illustrated, the surface area of the plate member 12 exceeds the surface defined by the smoking apertures 18.

Through this arrangement a major portion of the cooking of food may be accomplished by heat conduction from a source of heat such as a charcoal fire (not shown) to the food through the heat conductive plate member 12. Thus, the advantages of smoke flavoring of food are retained while the loss of radiant energy from the source of heat is minimized.

Integral with the plate member 12, and extending about the outer periphery thereof is a flange member 20. This flange member 20 projects downwardly from the plate member 12 so as to define, together with the lower surface 16 of the plate member, a smoke collection chamber 22 as indicated in FIG. 2.

Preferably, the flange member 20 extends continuously about the plate member so that the lateral portion of the collection chamber 22 is completely closed. However, discontinuities of the flange 20 are also contemplated.

The lowermost surface 24 of the flange 20 serves to provide a support for the griddle 10 by means of which the griddle may be rested upon conventional barbecue grills such as the one illustrated at 17 in FIG. 6, or the like.

In use, the griddle 10 may be rested on such a grill so as to overlie a suitable source of heat and smoke (for example, burning charcoal). Smoke eminating from the source and passing upwardly therefrom is constrained within the collection chamber 22 by means of the flange 20 and the lower surface 16 of the plate member 12.

It will be appreciated that smoke entering the chamber 22 is then directed upwardly by the chamber boundaries through the smoking apertures 18. This upwardly directed smoke, in practice, overlies the upper cooking surface of the griddle in a mist or fog-like fashion.

As the extent of the flange 20 becomes deeper, i.e., projects further beyond the lower surface 16 of the plate member 12, the amount of smoke which may be accumulated in the collection chamber increases. In the preferred embodiment, it has been found that a projection distance D of about five-sixteenths of an inch gives very satisfactory results.

At the outer periphery of the upper cooking surface 14 a retaining means 26 is provided. In the article illustrated in FIGS. 1 and 2, this retaining means 26 takes the form of an imperforate flange projecting upwardly from the cooking surface and tapering generally outwardly therefrom, as indicated at 28. This flange is contiguous with the outer periphery of the upper cooking surface 14 and with the illustrated downwardly projecting flange 20 which forms part of the collection chamber 22.

Thus, the flange 28 embodying the retaining means 26 may be formed by stamping a depressed area in the plate member 12 adjacent its outer periphery but spaced inwardly therefrom. Then, the outer periphery may be bent downward to form the smoke collection flange member 20 whereby the retaining means 26, the smoke collection chamber 22 and the plate member 12 are comprised in an integral unit.

The purpose of the retaining means 26 is two-fold. First, the grease from the cooked food is inhibited, by this retaining means 26, from dripping over the side of the griddle 10. Thus, the grease is retained within the confines of the upper cooking surface 14 so as to be caused to drip downwardly to the source of fire and smoke through the smoking apertures 18. Downward dripping of the grease, of course, causes the generation of further smoke to be collected by the collection chamber 22. It will be readily apparent that if the grease were permitted to substantially drip over or through the side of the griddle 10, the subsequently generated smoke would not be as readily collectable within the smoke collection chamber 22. The imperforate nature of the retaining means 26 prevents grease from dripping into the fire through the retaining means 26 and over the top thereof.

The second function of the retaining means 26 is to inhibit food on the cooking surface from sliding off of the cooking surface should it become necessary to physically displace the griddle. For example, if it is desired to move the food to a cooler or hotter portion of a grill or to temporarily remove the food in case of unwanted flames from the charcoal, the retaining means 26 militates against dropping of food into the charcoal.

A suitable handle means 30 attached to the plate member in any suitable manner, such as by rivoting to the flange 20 as illustrated at 32, may be employed so that movement of the griddle 10 may be readily accomplished.

It will also be apparent that the continuous upper cooking surface 14 provided by the apertured plate member 12 provides, as opposed to the relatively open grill network of the prior art, for ready manipulation of food on the griddle without the danger of dropping the food into a fire. A spatula 15 (see FIG. 1) or the like may be utilized to accomplish this manipulation by directing the spatula underneath the food in any direction along the griddle without danger of snagging the spatula.

Figure 4:
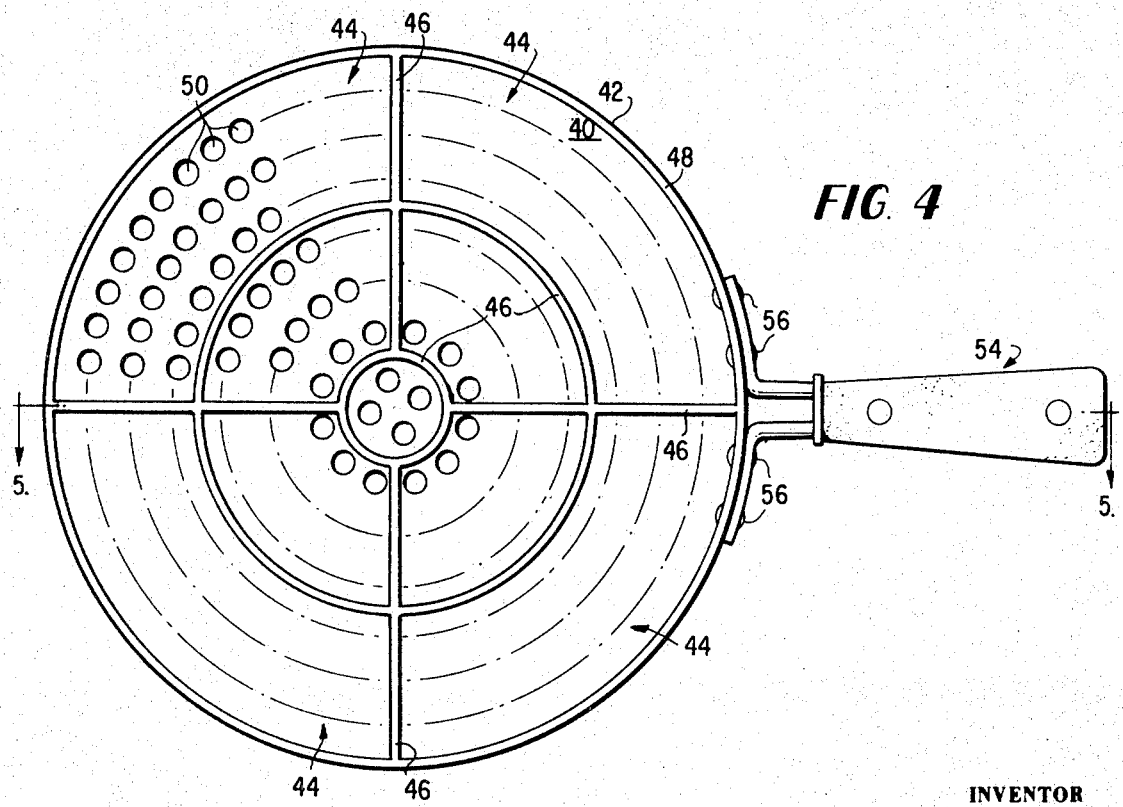
FIG. 4 is a bottom plan view of the barbecue griddle of FIG. 3.

In FIGS. 3, 4 and 5, another preferred embodiment of the present invention is shown. In this embodiment a barbecue griddle 34 is again formed of a plate member 36 having an upper cooking surface 38 and a lower surface 40. However, this plate member 36 is generally dished or concave.

A flange 42 is provided about the outer plate periphery and extends downwardly therefrom beneath the lower surface 40 so as to define a smoke collection chamber means in a manner similar to that in the embodiment in FIGS. 1 and 2. This chamber means may be subdivided into several chambers 44 by support flanges 46 forming an integral support network.

The bottom surface 48 of the outer flange 42 (and the bottom surfaces of the support flanges 46 if they are coplanar with the surface 48) provide a support for resting the griddle 34 on a conventional grill or other surface.

Circumferential sets of smoking apertures 50 are generally evenly spaced about the cooking surface 38 and function as do the apertures 18 discussed in connection with FIGS. 1 and 2. Also functioning similarly to the retaining means 26 of FIGS. 1 and 2 is a grease and food retaining means 52. In the embodiment of FIGS. 3, 4 and 5, however, the imperforate retaining means 52 is provided by the upwardly sloping, outer edge 54 of the dished, continuous plate member 36.

The griddle 34 may also be provided with a suitable handle 54 secured to the outer flange 42 by fastening means 56.

It will be appreciated that the article of FIGS. 3, 4 and 5 is similar with respect to function and advantages to that of FIGS. 1 and 2. Also, the geometry with respect to aperture spacing and the like, as well as alternatives in structure discussed in connection with FIGS. 1 and 2, is applicable to the FIGS. 3, 4 and 5 embodiment.

Thus, it will be seen that in following the present invention an improved barbecuing apparatus is provided in the form of a barbecue griddle which serves to facilitate flavoring of the food by adequate smoking while minimizing the problems associated with moving the food.

A significant advantage is provided by the flange means projecting downwardly from the lower surface of the plate member, which flange means defines, together with the lower surface, a smoke collection chamber.

Further advantages are provided by the retaining means adjacent the outer periphery of the upper cooking surface which inhibits grease from dripping downwardly over the outer griddle periphery and directs that grease to the portion of the source of smoke so that further smoke generated thereby may be readily collected in the collection chamber.

Other advantages are provided by the fact that the continuous, smooth cooking surface, as opposed to a relatively open network, enables food to be manipulated on the griddle without dropping it into the fire. The retaining means is also significant in this respect insofar as during movement of the griddle, loss of the food by sliding therefrom is inhibited.

Although the invention has been described in connection with preferred and illustrated embodiments, it will be appreciated that additions, substitutions, modifications and deletions not particularly described may occur to those skilled in the art without departing from the spirit of the invention as defined in the appended claims.

What is claimed is:

1. A barbecue griddle adapted to overlie a source of heat and smoke, the griddle comprising:
   a heat conductive plate member having a continuous, smooth upper cooking surface and a lower surface,
   said plate member being provided with a plurality of spaced smoking apertures extending therethrough from said upper cooking surface to said lower surface and disposed in a network sufficient to provide for smoke flavoring of food while excluding food from passing through said plate member,
   handle means connected to said plate member, and means, including said lower surface of said plate member and a flange means projecting downwardly therefrom, for defining a smoke collection chamber operative to collect smoke flowing upwardly from the smoke source and direct the collected smoke upwardly through said smoking apertures so as to overlie said upper cooking surface of said plate member; said flange means defining a generally planar support for said griddle.

2. A barbecue griddle according to claim 1 wherein:
   said flange means is integral with said plate member and extends peripherally about said flange member.

3. A barbecue griddle according to claim 1 and further including:
   retaining means, adjacent the outer periphery of said upper cooking surface and extending upwardly therefrom, for inhibiting grease from dripping downwardly over the outer periphery of said cooking surface and for inhibiting food on said cooking surface from sliding from said cooking surface.

4. Cooking apparatus for cooking food under the influence of a source of heat and smoke comprising in combination:
   a grill having a relatively open grill network overlying the source of heat and smoke; and
   a barbecue griddle removably resting on said grill in any selected one of a plurality of positions, said barbecue griddle comprising:
   a heat conductive plate member having a continuous, smooth upper cooking surface and a lower surface;
   said plate member being provided with a plurality of spaced smoking apertures extending therethrough from said continuous, smooth upper cooking surface to said lower plate surface;
   said smoking apertures being disposed in a network relatively closed as compared to said open network of said grill, and sufficient to provide for smoke flavoring of food while excluding food from passing through said plate member;
   handle means connected to said plate member; and
   imperforate retaining means, adjacent the outer periphery of said smooth, upper cooking surface and extending upwardly therefrom, for inhibiting grease from dripping downwardly over and through the outer periphery of said cooking surface and for inhibiting food on said cooking surface from sliding from said cooking surface.

5. Cooking apparatus according to claim 4 wherein:
   said apertures extending from said continuous, smooth upper cooking surface to said lower plate surface are generally arcuately bonded.

6. The combination according to claim 4 wherein:
   the surface area of said cooking surface exceeds the surface area defined by said smoking apertures.

7. The combination according to claim 4 wherein:
   said smoking apertures are generally evenly spaced about said plate member.

8. A method of cooking food under the influence of a source of heat and smoke comprising:
   supporting food to be cooked on a handled barbecue griddle comprised of a heat conductive plate member with a continuous smooth upper cooking surface, a lower surface and a plurality of spaced smoking apertures extending therethrough from the upper cooking surface to the lower surface and disposed in a network sufficient to provide for smoking flavoring of the food while excluding the food from passing through said plate member;

removably resting the barbecue griddle on a barbecue grill overlying the source of heat and smoke and having a relatively open grill network as compared to the aperture network of said plate member;

manipulating the food on the heat conductive plate member;

moving the griddle from its supported position on the grill utilizing the handle; and inhibiting grease from dripping downwardly over and through the outer periphery of said cooking surface and inhibiting food on said cooking surface from sliding therefrom, both with imperforate retaining means disposed adjacent the outer periphery of said cooking surface and extending upwardly therefrom.

9. The cooking method according to claim 8 wherein the step of manipulating the food in the heat conductive plate member includes the step of:

directing a spatula like member underneath the food and across the continuous, smooth upper cooking surface in any selected direction.

* * * * *